(12) United States Patent
Mukai et al.

(10) Patent No.: US 11,203,080 B2
(45) Date of Patent: Dec. 21, 2021

(54) WELDING METHOD USING SPECIAL TORCH

(71) Applicant: Kobe Steel, Ltd., Kobe (JP)

(72) Inventors: Naoki Mukai, Fujisawa (JP); Tokuji Maruyama, Fujisawa (JP); Reiichi Suzuki, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 578 days.

(21) Appl. No.: 16/077,456

(22) PCT Filed: Mar. 2, 2017

(86) PCT No.: PCT/JP2017/008280
§ 371 (c)(1),
(2) Date: Aug. 11, 2018

(87) PCT Pub. No.: WO2017/154725
PCT Pub. Date: Sep. 14, 2017

(65) Prior Publication Data
US 2019/0030636 A1 Jan. 31, 2019

(30) Foreign Application Priority Data
Mar. 8, 2016 (JP) .............................. JP2016-044223

(51) Int. Cl.
*B23K 9/23* (2006.01)
*B23K 9/29* (2006.01)
(Continued)

(52) U.S. Cl.
CPC .............. *B23K 9/325* (2013.01); *B23K 9/173* (2013.01); *B23K 9/29* (2013.01); *B23K 9/295* (2013.01);
(Continued)

(58) Field of Classification Search
CPC ................ B23K 35/0266; B23K 9/325; B23K 35/3608; B23K 35/368; B23K 35/362;
(Continued)

(56) References Cited

U.S. PATENT DOCUMENTS

| 6,380,515 B1 | 4/2002 | Knoll et al. |
| 2009/0107970 A1 | 4/2009 | Norrish et al. |

(Continued)

FOREIGN PATENT DOCUMENTS

| CN | 102161137 A | 8/2011 |
| CN | 104955610 A | 9/2015 |

(Continued)

OTHER PUBLICATIONS

International Preliminary Report on Patentability and Written Opinion dated Sep. 20, 2018 in PCT/JP2017/008280 (with English language translation).

(Continued)

*Primary Examiner* — Dana Ross
*Assistant Examiner* — Kuangyue Chen
(74) *Attorney, Agent, or Firm* — Oblon, McClelland, Maier & Neustadt, L.L.P.

(57) ABSTRACT

Provided is a welding method using a special torch and a flux cored wire, in which the special torch has a suction nozzle between the contact tip and the shield nozzle, and the flux cored wire has a flux filled inside the steel outer casing, and a seam portion where both ends of a metal in a width direction of the steel outer casing are butted or overlapped in a longitudinal direction of the flux cored wire.

9 Claims, 4 Drawing Sheets

(51) Int. Cl.
*B23K 35/368* (2006.01)
*B23K 9/32* (2006.01)
*B23K 35/362* (2006.01)
*B23K 35/30* (2006.01)
*B23K 9/173* (2006.01)
*B23K 35/02* (2006.01)
*B23K 35/36* (2006.01)

(52) U.S. Cl.
CPC .......... *B23K 9/298* (2013.01); *B23K 35/0266* (2013.01); *B23K 35/3053* (2013.01); *B23K 35/362* (2013.01); *B23K 35/3602* (2013.01); *B23K 35/3605* (2013.01); *B23K 35/3607* (2013.01); *B23K 35/368* (2013.01); *B23K 35/3608* (2013.01)

(58) Field of Classification Search
CPC ................ B23K 35/3605; B23K 9/298; B23K 35/3602; B23K 35/3053; B23K 9/29; B23K 9/295; B23K 9/173; B23K 35/3607
See application file for complete search history.

(56) References Cited

U.S. PATENT DOCUMENTS

| | | | | |
|---|---|---|---|---|
| 2010/0276396 A1* | 11/2010 | Cooper | ................. | B23K 9/325 219/74 |
| 2015/0314397 A1* | 11/2015 | Jeong | ..................... | C22C 38/50 403/272 |
| 2015/0360327 A1 | 12/2015 | Nakamura et al. | | |
| 2016/0045972 A1* | 2/2016 | Yamazaki | .......... | B23K 35/0255 219/74 |

FOREIGN PATENT DOCUMENTS

| | | | |
|---|---|---|---|
| EP | 2 871 021 | A1 | 5/2015 |
| EP | 2 952 288 | A1 | 9/2015 |
| GB | 2466254 | A | 6/2010 |
| JP | 57-11681 | U | 1/1982 |
| JP | 2-40435 | B2 | 9/1990 |
| JP | 9-150295 | A | 6/1997 |
| JP | 2002-506736 | A | 3/2002 |
| JP | 2008-68295 | A | 3/2008 |
| JP | 2010-188378 | A | 9/2010 |
| JP | 2015-110247 | A | 6/2015 |
| JP | 2015110247 | A * | 6/2015 |
| NL | 2004244 | A | 8/2010 |
| SU | 186055 | A | 10/1966 |

OTHER PUBLICATIONS

Wenyue Zhang, eds., "Welding Metallurgy (Fundamental Principle)" China Machine Press, Oct. 1995, pp. 113-114 and cover pages, (with partial English translation).

Jihe Fu, et al., "Welding Data Handbook" China Machine Press, Jun. 1994, pp. 168-169 and cover pages, (with partial English translation).

Extended European Search Report dated Jul. 26, 2019 in Patent Application No. 17763065.4, 8 pages.

Pohodnya I. K, et al., "Welding using a cored wire", Kiev, Naukova Dumka, 1972, p. 10, Fig.4 and p. 164, Fig.120, (with partial English translation).

International Search Report dated Apr. 4, 2017 in PCT/JP2017/008280 filed Mar. 2, 2017.

* cited by examiner

WELDING METHOD USING SPECIAL TORCH

TECHNICAL FIELD

The present disclosure relates to a welding method using a special torch, and more particularly to a welding method using a special torch having a suction nozzle and a specific flux cored wire.

BACKGROUND ART

In welding industry, hydrogen embrittlement and hydrogen cracking of weld metal due to diffusible hydrogen in weld metal have been problematic. Diffusible hydrogen in weld metal gathers in the grain boundary, microspace and the like of steel structure to become hydrogen molecules ($H_2$), which expands the volume. This expansion pressure causes cracks in weld metal and causes breakage of structural object. Regarding such hydrogen cracking, susceptibility to hydrogen cracking increases as the strength of steel increases, but in recent years, a high tensile strength steel tends to be used in welding.

FIG. 3 is a diagram for explaining a process in which diffusible hydrogen is absorbed in a weld metal. In FIG. 3, description will be given with assuming that a flux cored wire which is a flux-cored welding wire is used as welding wire. Further, FIG. 4 is a view showing a cross section of the flux cored wire.

A welding wire 201, which is a flux cored wire, is composed of a steel outer casing 202 constituting the outer periphery and a central portion 203. In the case of a flux cored wire, the central portion 203 includes a flux in which metal powder such as iron powder or alloy, and/or metal oxide powder, metal fluoride powder, etc. are mixed. Simultaneously when the welding wire 201 is fed through a contact tip 208, welding current flows from the contact tip 208 to the welding wire 201, and the welding wire 201 melts by an arc 209 at the tip end of the welding wire 201 to become a weld metal 210. At that time, since the welding current flows through a wire protruding portion 211 of the welding wire 201 protruded from the contact tip 208, so that resistance heating occurs and the temperature rises. For example, the rising temperature may reach 100° C. at about 5 mm from the tip end of the contact tip 208 and may rise to about 600° C. near the tip end of the wire 20 mm from the tip end of the contact tip 208.

When the temperature of the wire protruding portion 211 rises above 100° C., first, a hydrogen source 205 on a wire surface is vaporized and discharged from the welding wire 201. Subsequently, the central portion 203 is heated by heat conduction from the heated steel outer casing 202, and the hydrogen source 205 in the flux is also vaporized and discharged to the outside of the welding wire 201 through a seam 204 as a seam. Part of the hydrogen source 205 discharged from the welding wire 201 flows in the direction indicated by an arrow 213 in accordance with the flow of shielding gas (in the direction indicated by an arrow 207) supplied to a welding part from a nozzle 206 in the case of arc plasma air current and gas shielded arc welding, and is guided to the arc 209. Since the arc 209 has a high temperature of several thousand degrees, the hydrogen source 205, for example, $H_2O$ dissociates into diffusible hydrogen 212, is absorbed in droplets in the arc column and the weld metal 210, and enters the weld metal 210.

In this way, the hydrogen source present on the wire surface and the hydrogen source contained in the flux used for the welding wire are vaporized at the wire protruding portion heated to high temperature. The vaporized hydrogen source is then transported to the arc column and its vicinity by the flow of the shielding gas supplied in the case of arc plasma air current and gas shielded arc welding. The transported hydrogen source dissociates into hydrogen atoms and is absorbed in the weld metal.

As a countermeasure against hydrogen embrittlement and hydrogen cracking caused by diffusible hydrogen, preheating and post-heating may be performed in order to encourage the release of diffusible hydrogen from the weld metal to the outside. When a flux cored wire is used in welding, a method of reducing diffusible hydrogen by adding fluoride such as $CaF_2$ or $Na_3AlF_6$ to the flux is also used. Furthermore, a technique of mixing a small amount of $CF_4$ into the shielding gas supplied in gas shielded arc welding has also been proposed.

CITATION LIST

Patent Literatures

Patent Literature 1: Japanese Unexamined Patent Application Publication (Translation of PCT Application) No. 2002-506736
Patent Literature 2: Japanese Patent No. 1633976
Patent Literature 3: Japanese Examined Patent Publication No. 02-040435

SUMMARY OF THE INVENTION

Technical Problems

The hydrogen source in the welding wire is oil and moisture adhering to the wire surface, and moisture and organic matters adhering to the flux encapsulated in a flux cored wire and a metal cored wire (flux cored wire in which flux contained inside the wire is composed only of metal powder). Generally, the hydrogen source adhering to the flux is relatively more than the hydrogen source adhering to the welding wire surface. Therefore, in order to reduce the hydrogen source adhering to the flux, a case where a method of heating the flux at a high temperature and removing the hydrogen source may be adopted before manufacturing the welding wire. Also, it is necessary to prevent moisture absorption in the manufacturing process, but a large cost is required. Furthermore, even after commercialization, moisture is adsorbed from the air even during storage and working at a welding site with high humidity, and therefore there are various obstacles to reducing the hydrogen source.

In addition, as a countermeasure against hydrogen embrittlement and hydrogen cracking, when preheating and post-heating are performed, heating is performed at 150 to 250° C., which requires a large energy cost and labor. In addition, the preheating and post-heating are operated under high temperature and there is a problem of putting a heavy burden on welding workers. In the case of adding fluoride to the flux, as the amount of the additive is increased, the stability of the arc is deteriorated, so that the diffusible hydrogen may not be sufficiently reduced. Furthermore, even in the method of mixing $CF_4$ with shielding gas, there are problems of safety and deterioration in stability of the arc, and it can be said that it is difficult for the method to be widespread.

Therefore, when a high tensile strength steel and a thick plate are welded, a solid wire (FIG. 1A) or a seamless flux cored wire (FIG. 1B) are mainly used as welding materials with concern of the amount of diffusible hydrogen of weld metal.

The flux cored wire provides beneficial effects such as an effect in which a beautiful bead can be obtained by the effect of flux, an effect in which position welding is easily performed and welding can be performed with high efficiency welding conditions, and an effect in which large welding amount can be obtained. Further, the seamless flux cored wire is more preferably used, since the solid wire may be inferior in weldability such that bead shape is poor and position welding is difficult to be performed.

On the other hand, use of a seamed flux cored wire (FIG. 1C) for welding of a high tensile strength steel and a thick plate has been limited due to the above-mentioned problems. This is because the seamed flux cored wire absorbs moisture from the atmosphere through seam portion, it is easier to contain a hydrogen source as compared with the seamless flux cored wire and the amount of diffusible hydrogen of weld metal tends to be high.

In order to manufacture a seamless flux cored wire, there are a method of closing seam by subjecting a seam portion of a seamed wire to TIG welding or laser welding, and a method of filling pipe with a flux, repeating rolling/wire drawing processing to finish the wire. However, in the former case, the productivity is limited by the welding speed, and the efficiency is not increased, and in the latter case, the number of times of rolling/wire drawing processing is increased and the productivity is lowered. Therefore, the seamless flux cored wire has high cost as compared with the seamed flux cored wire, and improvement has been desired.

The torch shown in Patent Literature 1 sucks fumes from the opening portion that surrounds the periphery of the welding wire protruding from the contact tip and faces the tip end portion of the wire. Although not shown in Patent Literature 1, it is understood as follows: the torch sucks simultaneously together with fumes the hydrogen source that has been separated from the welding wire during welding, discharges the hydrogen source to the outside of the welded portion, and reduces the amount of diffusible hydrogen in weld metal.

However, Patent Literature 1 does not have an idea about the diffusible hydrogen reduction effect, and does not describe an optimal wire design combination. In addition, it has not naturally been studied about the torch configuration for effectively exerting the hydrogen suction performance.

On the other hand, as a wire used for gas shielded arc welding, Patent Literature 2 discloses a flux cored wire filled with a flux having specific composition in a steel outer casing. It has been shown that the flux cored wire contains 0.1 to 5% by weight of an alkali metal, and therefore the arc is stabilized and it is possible to prevent melting down during thin plate welding; however, the alkali metal has high affinity with moisture, and therefore when the flux cored wire is used as a seamed flux cored wire, low temperature cracking may be caused in the case of applying the flux cored wire to a high tensile strength steel plate and a thick steel plate since the wire contains a large amount of moisture, Further, Patent Literature 3 discloses a slag-based flux cored wire having specific composition. The slag-based flux cored wire is a welding wire for a high tensile strength steel plate that can provide good low temperature toughness for weld metal even when the content of Ni in the weld metal is small. In order to attain good arc stability and weldability while using a seamed flux cored wire, it is necessary to contain an appropriate amount of an alkali metal, but the alkali metal is a factor of increasing the diffusible hydrogen amount, so that it cannot be positively added.

Therefore, an embodiment of the present invention aims to provide a welding method for a high tensile strength steel plate and a thick plate using a low-cost seamed flux cored wire with good weldability and welding efficiency.

Solution to Problems

As a result of earnest research, the inventors have found that a flux cored wire having a seam portion can be used by using a welding torch (special torch) having a suction nozzle, and this finding has led to the completion of the present invention.

That is, embodiments of the present invention pertain to the following [1] to [10].

[1] A welding method using a special torch and a flux cored wire,
in which
the special torch has a suction nozzle between a contact tip and a shield nozzle, and
the flux cored wire has a flux filled inside a steel outer casing, and a seam portion where both ends of a metal in a width direction of the steel outer casing are butted or overlapped in a longitudinal direction of the flux cored wire.

[2] The welding method according to the above [1], in which in a cross section of the seam portion, when a length of a portion where clearance at both ends of the metal in the width direction of the steel outer casing is less than 20 μm is denoted by La, a length of a portion where clearance is 20 μm or more and less than 40 μm is denoted by Lb, and a length of a portion where clearance is 40 μm or more and less than 100 μm is denoted by Lc, a value represented by Lseam=2.0× La+1.5× Lb+Lc is 0.1 to 1.5 mm.

[3] The welding method according to the above [1] or [2], in which the flux cored wire has a wire diameter of 1.2 to 2.0 mm and a ratio of the flux to a total mass of the flux cored wire is 8 to 30 mass %.

[4] The welding method according to the above [1] or [2], in which the flux contains a slag forming agent, the slag forming agent is composed of at least one compound selected from the group consisting of a metal oxide, a metal fluoride and a metal carbonate and an impurity, and a ratio of the slag forming agent to the total mass of the flux cored wire is 3 to 21 mass %.

[5] The welding method according to the above [4], in which the slag forming agent contains, in a ratio to the total mass of the flux cored wire:
3.5 to 20.5 mass % of the metal oxide;
0 to 0.5 mass % (including 0) of the metal fluoride; and
0 to 0.5 mass % (including 0) of the metal carbonate.

[6] The welding method according to the above 5, in which the metal oxide contains, in a ratio to the total mass of the flux cored wire:
1.5 to 15.0 mass % of $TiO_2$;
0.15 to 4.0 mass % of $SiO_2$;
0 to 3.0 mass % (including 0) of $ZrO_2$;
0 to 2.0 mass % (including 0) of $Al_2O_3$; and
0.01 to 0.8 mass % of ($Na_2O+K_2O+Li_2O$).

[7] The welding method according to the above [4], in which the slag forming agent contains, in a ratio to the total mass of the flux cored wire:
0 to 1.5 mass % (including 0) of the metal oxide;
1.5 to 8.5 mass % of the metal fluoride; and
0 to 5.0 mass % (including 0) of the metal carbonate.

[8] The welding method according to the above [7], in which the metal fluoride contains, in a ratio to the total mass of the flux cored wire:
0 to 5.0 mass % (including 0) of $CaF_2$;
0 to 5.0 mass % (including 0) of $BaF_2$;
0 to 5.0 mass % (including 0) of $SrF_2$; and
1.5 to 8.0 mass % of $(CaF_2+BaF_2+SrF_2)$.

[9] The welding method according to the above [4], in which the metal carbonate contains 0 to 5 mass % (including 0) of $(CaCO_3+BaCO_3)$ in a ratio to the total mass of the flux cored wire.

[10] The welding method according to the above [1] or [2], in which
a distance $D_{t-b}$ along a longitudinal direction of a welding wire between a tip end of the contact tip and a base material in the special torch is 15 to 40 mm, and
a distance $D_{t-k}$ along the longitudinal direction of the welding wire from the tip end of the contact tip to a tip end of the suction nozzle and the distance $D_{t-b}$ satisfy relationships:

$$D_{t-k} \text{ (mm)} \geq 0.3 \times D_{t-b} \text{ (mm) and}$$

$$D_{t-k} \text{ (mm)} \leq D_{t-b} \text{ (mm)} - 8.$$

Advantageous Effects of Invention

According to the embodiments of the present invention, it is possible to prevent an increase in diffusible hydrogen amount of weld metal, and it is also possible to weld a high tensile strength steel and a thick plate by a low-cost seamed flux cored wire with good weldability and welding efficiency

DESCRIPTION OF EMBODIMENTS

Figure 1A:
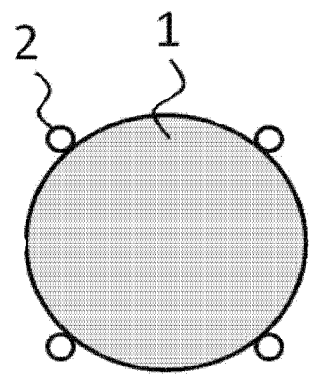
FIG. 1A is a schematic cross-sectional view showing a form of a solid wire.
Figure 1B:
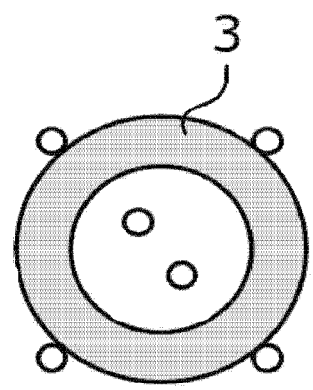
FIG. 1B is a schematic cross-sectional view showing a form of a seamless flux cored wire.
Figure 1C:
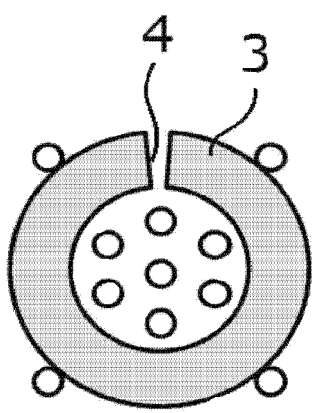
FIG. 1C is a schematic cross-sectional view showing a form of a seamed flux cored wire.

Hereinafter, embodiments of the present invention will be described in detail. It should be noted that the present invention is not limited to the embodiments described below. Further, in the specification, numerical ranges indicated using "(from) . . . to . . . " include the former number as the lower limit value and the later number as the upper limit value.

The welding method according to an embodiment of the present invention is a welding method using a special torch and a flux cored wire, in which the special torch has a suction nozzle between a contact tip and a shield nozzle, and the flux cored wire has a flux filled in a steel outer casing (that is, inside the steel outer casing), and a seam portion where both ends of a metal in a width direction of the steel outer casing are butted or overlapped in a longitudinal direction of the flux cored wire.

Here, the flux means a material obtained by mixing metal powder such as iron powder or alloy, metal oxide powder, metal fluoride powder, and the like.

During welding, the temperature of a wire fed to a gap between the contact tip and the base metal rises due to Joule heating, because welding current flows from the tip end to the wire. In welding using a flux cored wire, the moisture of the flux is used largely as a diffusible hydrogen source held by the wire, and it is preferred to discharge the moisture outside the system.

At this time, when the wire structure is a seamless flux cored wire, moisture is retained up to the molten portion by the arc because a moisture discharge port does not exist on the side of the wire, and hydrogen is easily absorbed in the molten metal.

On the other hand, in the seamed flux cored wire, the seam portion serves as a moisture discharge port, and moisture can be discharged to the outside of the wire by thermal energy before reaching the arc region. In general gas shielded arc welding, moisture discharged to the outside of the wire is transferred to the arc by the air flow of the shielding gas, and as a result, it is absorbed in the molten metal.

Also, by sucking part of the shielding gas using the special torch, it is possible to prevent the molten metal from being brought into contact with moisture (which is thought to be dissociated at high temperature in the arc to become hydrogen atoms) to make harmless.

That is, the inventors of the present invention have found that the moisture already held by the flux during manufacturing cannot be effectively reduced even by using the special torch in the seamless flux cored wire, but in the case of the seamed flux cored wire, the moisture can be effectively reduced. The embodiment of the present invention pertains to a welding method for effectively realizing this effect.

Furthermore, the inventors have found that in the welding method using the seamed flux cored wire and the special torch, better results can be obtained by the structure of the seamed flux cored wire to be applied and the design of the flux to be applied.

[Seamed Flux Cored Wire]

The flux cored wire in the embodiment of the present invention has a flux filled in the steel outer casing, and a seam portion where both ends of a metal in the steel outer casing are butted or overlapped in a longitudinal direction of the flux cored wire (seamed flux cored wire).

Here, the steel outer casing means a rolled steel strip.

Further, in this specification, although the composition (mass ratio) of the flux cored wire is a design value in any case, a flux cored wire having roughly the same composition as the designed value can be obtained. Further, the composition of the wire can be identified by composition analysis of flux particles through an electron beam microanalyzer or X-ray diffraction method and chemical analysis (ICP emission spectroscopy, atomic absorption spectrometry, etc.) of a solution in which the entire wire is dissolved.

Even when a water discharge path is long in the seamed flux cored wire (hereinafter may be simply referred to as "wire"), the water discharge efficiency during welding may be lowered.

Therefore, in the seam part, Lseam is defined as a coefficient relating to the overlapping margin of overlapping the both ends of the metal in the steel outer casing of the flux cored wire, and a preferred range is defined from the viewpoint of water discharge efficiency.

When a flux cored wire is manufactured by using a steel strip (steel outer casing) and flux, the seam portion means a portion where both ends in the width direction of the steel strip are butted or overlapped, and the seam portion is present all along the line in the longitudinal direction of the seamed flux cored wire. The flux cored wire obtained by fusion bonding the seam of the wire is a seamless flux cored wire.

In the seam portion (cross section of the seam portion), the Lseam is a value represented by Lseam=2.0× La+1.5× Lb+Lc when the length of a portion where the clearance at both ends of the metal of the steel outer casing is less than 20 μm (length of a portion less than 20 μm) is denoted by La, the length of a portion where the clearance is 20 μm or more and less than 40 μm (length of a portion of 20 μm or more and less than 40 μm) is denoted by Lb, and the length of a portion where the clearance is 40 μm or more and less than 100 μm (length of a portion of 40 μm or more and less than 100 μm) is denoted by Lc. The value of the Lseam can be obtained by observing the cross section of the wire and is an average value when any three cross sections of the wire are observed.

The seamed flux cored wire can be classified into a butt shape, a lap shape, an apple shape, etc., from the cross sectional shape thereof depending on difference in butting or overlapping of the both ends of the steel outer casing, and is not particularly limited. Among them, the butt shape, the lap shape and the apple shape are preferred because moisture is easily discharged from inside the wire.

Figure 2A:
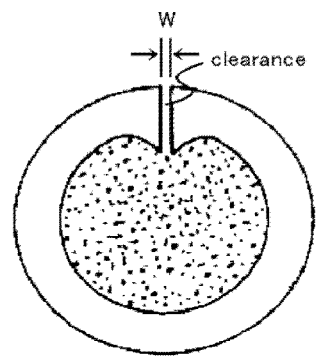
FIG. 2A is a schematic cross-sectional view showing a cross sectional shape of a seamed flux cored wire called a butt shape.

In addition, as shown in the schematic cross-sectional view of FIG. 2A, the butt shape is a structure in which the both ends of the steel outer casing are butted so that the positions of the both ends of the steel outer casing coincide with each other. As shown in the schematic cross-sectional view of FIG. 2B, the lap shape is a structure in which the both ends of the steel outer casing are processed so that the vicinity of the both ends of the steel outer casing overlaps vertically. As shown in the schematic cross-sectional view of FIG. 2C, the apple shape is a structure in which the vicinities of the both ends of the steel outer casing are bent and then the both ends of the steel outer casing are butted so that the folded portions coincide with each other.

In FIG. 2A, the clearance width W may be constant or different, and the width W of less than 20 μm is denoted by La, the width W of 20 μm or more and less than 40 μm is denoted by Lb, and the width W of 40 μm or more and less than 100 μm is denoted by Lc. The width W of 100 μm or more does not affect the value of the Lseam. In addition, La, Lb and Lc may be 0 μm (not present) in each case.

Figure 2B:
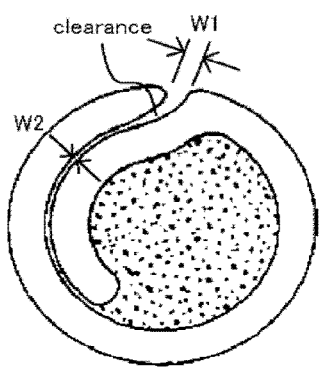
FIG. 2B is a schematic cross-sectional view showing a cross sectional shape of a seamed flux cored wire called a lap shape.
Figure 2C:
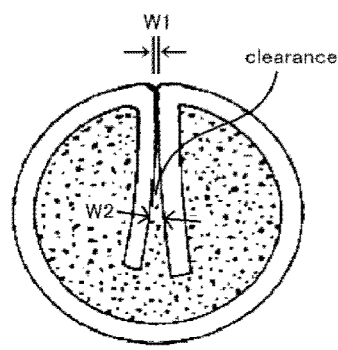
FIG. 2C is a schematic cross-sectional view showing a cross sectional shape of a seamed flux cored wire called an apple shape.
Figure 3:
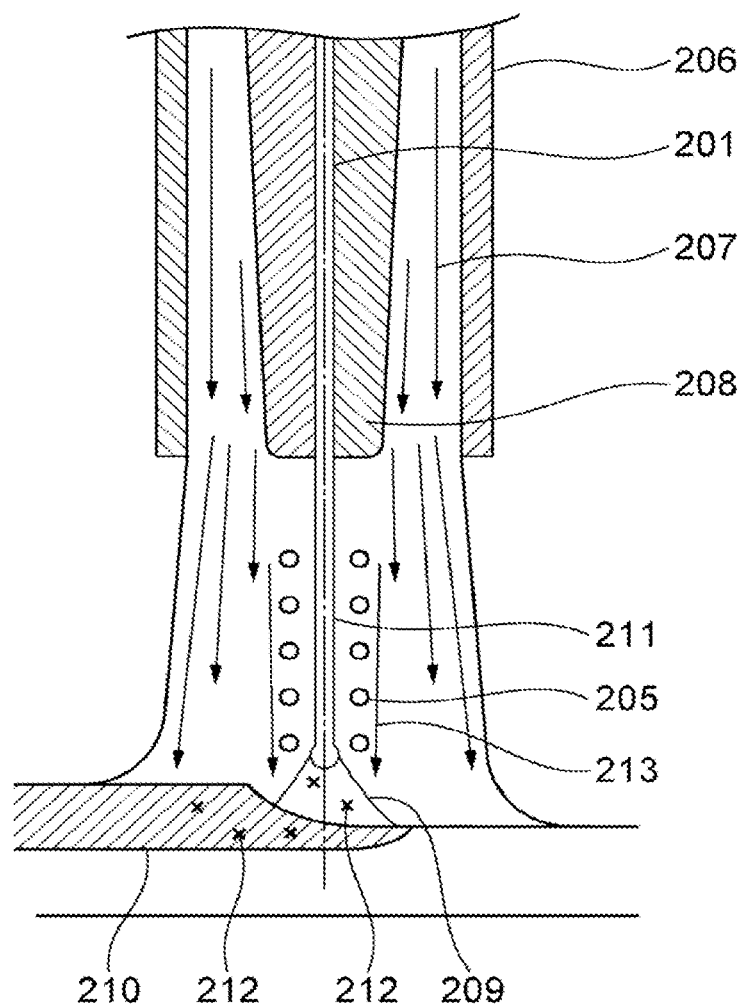
FIG. 3 is a view for explaining a process in which diffusible hydrogen is absorbed in a weld metal.
Figure 4:
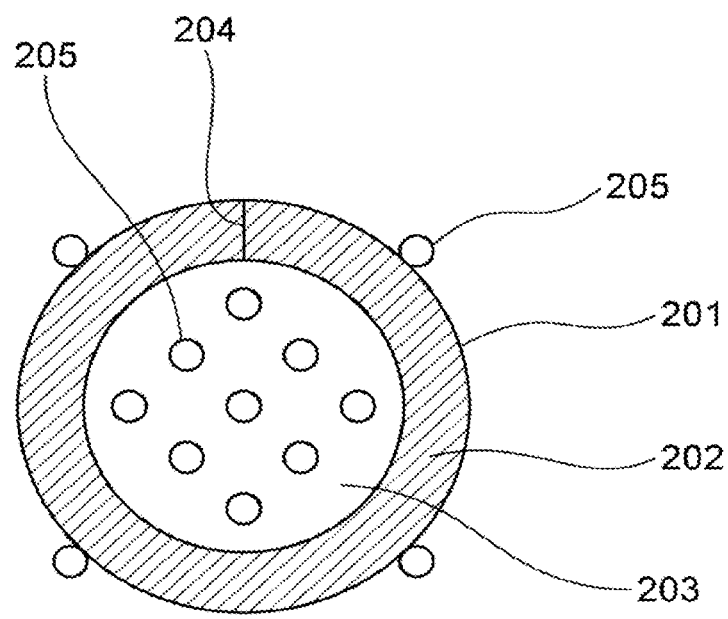
FIG. 4 is a view showing a cross section of a flux cored wire.

Also in FIGS. 2B and 2C, similarly, the clearance widths W1 and W2 at arbitrary positions may not be equal, such as W1≠W2, or may be equal to each other, such as W1=W2. The clearance width W of less than 20 μm is denoted by La, the clearance width W of 20 μm or more and less than 40 μm is denoted by Lb, and the clearance width W of 40 μm or more and less than 100 μm is denoted by Lc, and the clearance width W of 100 pm or more does not affect the value of the Lseam. In addition, La, Lb and Lc may be 0 μm (not present) in each case.

Specifically, the value of the Lseam is more preferably 0.1 to 1.5 mm, and further preferably 0.15 mm or more. The value of the Lseam is further preferably 1.2 mm or less, and furthermore preferably 1.0 mm or less.

If the Lseam is excessively small, the overlapping portion is easily opened due to deformation within the wire feed path, and the flux may be spilled. Due to the flux spill, wire component design may not be maintained, and wire feed troubles associated with clogging in the feed path may occur. On the other hand, if the Lseam is excessively large, the hydrogen discharge efficiency may be low. Thus Lseam, composed of the elements La, Lb and Lc, comprises a result effective variable for limiting hydrogen discharge efficiency.

Although the wire diameter of the flux cored wire is not particularly limited, in the welding of a high tensile strength steel and a thick plate that is aimed by the welding method according to the embodiment of the present invention, the diameter of the wire is preferably 1.0 mm or more from the viewpoint of the construction efficiency. From the viewpoint of weldability, the wire diameter is preferably 2.0 mm or less, and more preferably 1.2 mm or more and 1.6 mm or less.

The ratio of the flux to the total mass of the flux cored wire is preferably 8 to 30 mass %, and more preferably 10 mass % or more and more preferably 25 mass % or less from the viewpoint of manufacturability of the wire.

The flux types in the flux cored wire can roughly be classified into two types, a metal-based flux and a slag-based flux. The metal-based flux cored wire (metal cored wire) is mainly aimed at high welding efficiency, and the slag-based flux cored wire is mainly aimed at good weldability, beautiful bead appearance, and the like.

In the case of the slag-based flux cored wire, the flux contains a slag forming agent. Since the slag forming agent contains at least one compound selected from the group consisting of metal oxides, metal fluorides and metal carbonates, moisture is easily adsorbed on the surface, and the diffusible hydrogen amount in weld metal welded using a slag-based flux cored wire tends to increase. Accordingly, it is usually necessary to pay attention to use the slag-based flux cored wire in welding of a high tensile strength steel and a thick plate. The slag forming agent contains impurities in addition to the above compounds.

By using the wire including the slag forming agent and performing welding by combination with the special torch, better weldability and ease of handling due to low hydrogen (less concern of low temperature cracking) can be achieved simultaneously.

The ratio of the slag forming agent to the total mass of the wire is preferably 3 to 21 mass % from the viewpoint of weldability, more preferably 5 mass % or more and 20 mass % or less.

When the amount of the slag forming agent is small, seizure of the slag easily occurs on the surface of the weld bead, whereas when it is too much, the bead tends to form a convex shape.

When the slag forming agent contains an oxide as the main slag component, it is preferred from the viewpoint of weldability that the slag forming agent contains 3.5 to 20.5 mass % of a metal oxide, 0 to 0.5 mass % (including 0) of a metal fluoride, and 0 to 0.5 mass % (including 0) of a metal carbonate, in a ratio to the total mass of the wire.

Among them, it is more preferred from the viewpoint of obtaining a better bead appearance, a bead shape and the like that the metal oxide contains 1.5 to 15.0 mass % of $TiO_2$, 0.15 to 4.0 mass % of $SiO_2$, 0 to 3.0 mass % (including 0) of $ZrO_2$, and 0 to 2.0 mass % (including 0) of $Al_2O_3$, in a ratio to the total mass of the flux cored wire.

The amount of $TiO_2$ is further preferably 2.5 mass % or more and 12.0 mass % or less. The amount of $SiO_2$ is further preferably 0.2 mass % or more and 3.0 mass % or less. The amount of $ZrO_2$ is further preferably 2.5 mass % or less, and the amount of $Al_2O_3$ is further preferably 1.5 mass % or less.

It is preferred to further add an alkali metal oxide such as $Na_2O$, $K_2O$, $Li_2O$ or the like as an arc stabilizer for obtaining better arc stability in the slag forming agent containing an oxide as the main slag component. It is more preferred that the metal oxide contains 0.01 mass % or more, and further preferably 0.02 mass % or more of the sum of ($Na_2O+K_2O+Li_2O$) in a ratio to the total mass of the wire.

On the other hand, an alkali metal has high affinity with water, and it is very easy to adsorb moisture. Therefore, an excessive alkali metal leads to an increase in diffusible hydrogen amount in weld metal. Since the arc stabilizing effect of the alkali metal oxide is saturated in a small amount, it is more preferred that the metal oxide contains 0.8 mass % or less, and further preferably 0.5 mass % or less of the sum of ($Na_2O+K_2O+Li_2O$), in a ratio to the total mass of the wire.

By applying the welding method combining the slag-based flux cored wire with the special torch, the slag-based flux cored wire including the slag forming agent containing a metal oxide as the main slag component as well as an alkali metal oxide, it is possible to perform welding that achieves more excellent arc stability and ability to be low in hydrogen simultaneously.

Some flux cored wires whose slag forming agent contains a fluoride as the main slag component may provide a special effect such that weld metal is particularly excellent in toughness, welding can be performed without using shielding gas (called self-shield) or the like. In this case, it is preferred from the viewpoint of weldability that the slag forming agent contain 0 to 1.5 mass % (including 0) of a metal oxide, 1.5 to 8.5 mass % of a metal fluoride, and 0 to 5.0 mass % (including 0) of a metal carbonate, in a ratio to the total mass of the wire.

Among them, it is more preferred from the viewpoint of obtaining a better bead appearance, a bead shape and the like that the metal fluoride contains 0 to 5.0 mass % (including 0) of $CaF_2$, 0 to 5.0 mass % (including 0) of $BaF_2$, 0 to 5.0 mass % (including 0) of $SrF_2$, and 1.5 to 8.0 mass % of ($CaF_2+BaF_2+SrF_2$), in a ratio to the total mass of the flux cored wire.

It is also preferred that the metal carbonate contains 0 to 5 mass % (including 0) of ($CaCO_3+BaCO_3$) in a ratio to the total mass of the flux cored wire. In the case of containing ($CaCO_3+BaCO_3$) at a small amount, the concentration of the arc is improved, and in the case of containing ($CaCO_3+BaCO_3$) in an amount of 2 mass % or more, the weld metal performance (blow hole resistance) during welding without using shielding gas is improved, and accordingly it is preferred.

The metal fluoride powder tends to be a fine powder during the pulverization process, and the surface area thereof increases, so that moisture tends to be adsorbed. For that reason, this leads to an increase in diffusible hydrogen amount in the weld metal, and the flux cored wire may not be applied to the welding of a high tensile strength steel and a thick plate. However, by applying the welding method combining the slag-based flux cored wire with the special torch, the slag-based flux cored wire including the slag forming agent containing a metal fluoride as the main slag component, the ability to be low in hydrogen is attained in a flux cored wire capable of providing high toughness and a self-shielding property, and the flux cored wire is easily to be applied to the welding of a high tensile strength steel and a thick plate.

Examples of the metal oxide other than the above components contained in the slag forming agent include MgO, CaO, BaO, $V_2O_5$, $Cr_2O_3$, $Nb_2O_5$, $Y_2O_3$, $La_2O_3$, $Ce_2O_3$, $Pr_2O_3$, $Nd_2O_3$, BiO, and the like.

Examples of the metal fluoride other than the above components contained in the slag forming agent include $AlF_3$, $CeF_3$, $MgF_2$, KF, NaF, LiF, $K_2SiF_6$ (potassium silicofluoride), $Na_3AlF_6$ (cryolite), and the like.

Examples of the metal carbonate other than the above components contained in the slag forming agent include $MgCO_3$, $FeCO_3$, $MnCO_3$, $K_2CO_3$, $Na_2CO_3$, $Li_2CO_3$, and the like.

[Special Torch]

In the welding method according to the embodiment of the present invention, a special torch is used which has a suction nozzle between a contact tip and a shield nozzle. By having such a structure, the special torch can suck gas close to the arc region.

Further, in order to efficiently suck the moisture discharged from the seam portion of the seamed flux cored wire during welding, there is a more favorable relationship between the structure of the special torch and the distance $D_{t-b}$ along the longitudinal direction of the welding wire between the tip end of the contact tip and the base material in the special torch during welding.

That is, when the distance along the longitudinal direction of the welding wire from the tip end of the contact tip to the tip end of the suction nozzle is denoted $D_{t-k}$, it is more preferred that the distance $D_{t-b}$ and the distance $D_{t-k}$ satisfy the following relational expressions.

$$D_{t-k} \text{ (mm)} \geq 0.3 \times D_{t-b} \text{ (mm), and}$$

$$D_{t-k} \text{ (mm)} \leq D_{t-b} \text{ (mm)} - 8$$

During welding, the longer the welding wire is away from the contact tip, the longer the Joule heating time due to the welding current becomes and the higher the temperature becomes. Since the discharge rate of moisture increases as the temperature rises, it is preferred that the special torch sucks the gas close to the arc region as much as possible. Therefore, it is required to lengthen the covering range of the welding wire by the suction nozzle.

On the other hand, from the viewpoint of weldability, the distance $D_{t-b}$ has a preferred range (15 to 40 mm). The distance $D_{t-b}$ is more preferably 20 mm or more and 35 mm or less.

Furthermore, in order to avoid damage due to radiant heat of the arc, it is preferred that the suction nozzle is separated from the base material by 8 mm or more ($D_{t-k}$ (mm)$\leq D_{t-b}$ (mm)$-8$), and more preferably by 10 mm or more.

Further, when the distance $D_{t-k}$ is 30% (0.3) or more of the distance $D_{t-b}$, it is possible to perform suction at a higher temperature portion of the wire (a range where more hydrogen source is released). From the viewpoint of hydrogen reduction rate, the distance $D_{t-k}$ is more preferably 35% or more. Also, when the distance $D_{t-k}$ is so close to the distance $D_{t-b}$, damage due to radiation heat may occur, and therefore it is preferred that the above two relational expressions are satisfied.

The special torch used in the embodiment of the present invention includes a structure shown below as an example, but the structure is not limited thereto.

The structure is such that the welding wire is automatically fed into the cylinder, and the arc welding is performed using the welding wire.

The torch barrel has a mechanism for supporting the shield nozzle and the tip body. The torch barrel can supply the welding wire to be supplied to the tip end of the tip body (the rear end of the contact tip) via the inner tube in a state where the tip body is attached. In addition, the torch barrel energizes the welding current to the tip body, and further supplies the shielding gas to the space formed between the inner tube and the tip body. The tip body is provided with a mechanism for supporting an orifice, a contact tip, and a suction nozzle. The chip body is formed of a material having conductivity such as metal.

The orifice has a mechanism for rectifying the shielding gas. That is, the orifice is usually in a cylindrical shape and is mounted by inserting the orifice from the tip end side of the outer periphery of the tip body. The contact tip is provided with a mechanism for feeding the welding current to the welding wire and for guiding the welding wire to the work to be welded. Similarly to the tip body, the contact tip is also made of a material having conductivity such as metal.

The suction nozzle is arranged so as to surround the periphery of the contact tip and the welding wire supplied from the tip end of the contact tip, and the shield nozzle is arranged so as to surround the periphery of the suction nozzle.

The shielding gas supplied to the tip body is further supplied from the tip body to the space between the shield nozzle and the suction nozzle via the orifice to protect the arc and the weld metal.

The gas in the space between the suction nozzle and the contact tip is sucked by a negative pressure via a suction gas path different from the shielding gas supply formed in the tip body. Pumps, ejectors and the like are conceivable as methods for generating the negative pressure, but they are not particularly limited.

In addition, in the welding method according to the embodiment of the present invention, those capable of being conventionally used can be used regarding the detailed structure of the welding device and torch, the shielding gas, the welding conditions, the materials to be welded (workpiece, base metal), and the like.

<Weld Metal>

The weld metal obtained by the welding method according to the embodiment of the present invention preferably has a hydrogen reduction rate of 30% or more, more preferably 40% or more, as compared with the case of welding using an ordinary torch.

The method for measuring the hydrogen reduction rate is as described in [EXAMPLES].

Before and after the welding, it is preferable as the flux spill (scattering etc.) is less. When the flux spill is great, it is necessary to clean the welding conduit liner for the torch.

Regarding the arc stability during welding, it is preferable as the fluctuation of the arc and the arc interruption are less. Regarding the weld bead appearance, it is preferable as the appearance is flat. Regarding the seizure after peeling the slag, it is preferable as the seizure is less.

EXAMPLES

Hereinafter, the embodiments of the present invention will be described in more detail with reference to examples, but the present invention is not limited to these examples, and modification may be made within the scope that is compatible with the gist of the present invention, and any of them can be comprehended in the technical scope of the present invention.

[Evaluation Method]

(Hydrogen Reduction Rate)

With respect to the weld metal obtained by the welding method according to the embodiment of the present invention, the diffusible hydrogen amounts was measured using both an ordinary torch and the special torch, and the hydrogen reduction rate was obtained from the ratio.

Specifically, the hydrogen reduction rate was determined as follows: measurements were carried out based on "Method for measurement of amount of hydrogen evolved from steel welds JIS Z 3118 (2007)" using an ordinary torch and the special torch to obtain results. The obtained results were used for the equation shown in "Calculation of the amount of hydrogen per unit mass of deposited metal JIS Z 3118 (2007) 7.2". Then, the obtained values were used as the diffusible hydrogen amounts, and a value obtained from the ratio of the obtained values was determined as the hydrogen reduction rate.

The welding conditions are as follows and the welding was automatic welding using a moving truck. An average value of 3 trials was adopted as the result value. The distance between the contact tip and the base metal was not in accordance with JIS in some tests, and was described in the examples.

Welding current: 270 A
Arc voltage: 32 V
Welding speed: 350 mm/min
Welding position: downward (Flux Spill)

A welding conduit liner for a torch having a length of 3.5 m, whose mass had been measured in advance, was made to circulate three times in a circle with a diameter of 300 mm, and a flux cored wire was allowed to pass through the conduit liner. After passing through 2 kg of the wire, the mass of the conduit liner was measured, and the change in mass before and after passing through the wire was regarded as a flux spill.

The evaluation results of the flux spill are shown in the tables. In the tables, "A" means that the mass change was 0 to 0.20 g, which means that the welding was continuously possible for a long time and was very good. In the tables, "B" means that the change in mass was more than 0.20 g and 0.50 g or less, and conduit liner cleaning was desirable every several hours, but it was good. In the tables, "C" means that the mass change was more than 0.50 g, which was an ordinary evaluation requiring periodic conduit liner cleaning every several hours.

(Bead Appearance/Arc Stability)

Horizontal fillet welding was carried out by combining the SM 490A 12 mmt base material. The welding length was set to 250 mm, and an automatic truck was used. After the comprehensive sensory evaluation of the fluctuation of the arc and arc interruption during the welding, the flatness of the bead and the slag seizure were evaluated by visual examination.

The welding conditions are as follows.

Welding current: 270 A
Arc voltage: proper (adjusted with wire at 23 to 32 V)
Welding speed: 400 mm/min The evaluation results are shown in the tables. With regard to the "arc stability", "A" means that there was no fluctuation of the arc and arc interruption, and the arc stability was very good, "B" means that the fluctuation of the arc was slightly found but there was no arc interruption, and the arc stability was good, and "C" means that the fluctuation of the arc was large or the arc interruption was observed.

With regard to the "flatness of the bead" as the "bead appearance", "A" means that a flat bead was obtained, "B" means that the bead had a somewhat convex shape but there was no problem in construction, "C" means that the bead had a convex shape, and in multi-layer welding construction, it was judged that maintenance was required by a grinder between passes.

With regard to the "slag seizure", "A" means that there was no seizure after the slag peeling, "B" means that seizure was observed after the slag peeling, but it was such an extent that there was no problem in construction, "C" means that there was a lot of seizure after the slag peeling, and in multi-layer welding construction, it was judged that maintenance was required by a grinder and/or a wire brush between passes.

Examples 1 to 34 and Comparative Examples 1 to 4

The composition of the flux cored wire used, the length index (Lseam value) of the outer casing mating portion of the seam, the wire diameter and the like are as shown in the table.

The distance $D_{t-b}$ along the longitudinal direction of the welding wire between the tip of the contact tip of the special torch used for the welding and the base metal, and the distance $D_{t-k}$ along the longitudinal direction of the welding wire from the tip of the contact tip to the tip of the suction nozzle are shown in the tables.

In the tables, "weld metal strength class" means that the tensile strength of the weld metal is equal to or larger than the numerical value, which means that it can be applied to a base material having a strength less than the strength shown here.

The results in Examples 1 to 20 and 27 to 34 and Comparative Examples 1 to 4 were obtained using a flux cored wire containing a slag forming agent that contained a metal oxide as the main slag component and further contained an alkali metal, and the results in Examples 21 to 26 were obtained using a flux cored wire containing a slag forming agent that contained a metal fluoride as the main slag component.

TABLE 1

|  | Wire Seam | La [mm] | Lb [mm] | Lc [mm] | Lseam [mm] | Wire Diameter [mm] | Flux Ratio [%] | Slag Ratio [%] | Total of Metal Oxide [%] | Total of Metal Fluoride [%] | Total of Metal Carbonate [%] |
|---|---|---|---|---|---|---|---|---|---|---|---|
| Example 1 | Presence | 0.00 | 0.00 | 0.08 | 0.08 | 1.6 | 29.5 | 13.0 | 12.80 | 0.20 | 0.00 |
| Example 2 | Presence | 0.00 | 0.00 | 0.11 | 0.11 | 1.6 | 28.0 | 13.0 | 12.80 | 0.20 | 0.00 |
| Example 3 | Presence | 0.00 | 0.04 | 0.10 | 0.16 | 1.6 | 25.0 | 13.0 | 12.80 | 0.20 | 0.00 |
| Example 4 | Presence | 0.19 | 0.06 | 0.02 | 0.49 | 1.2 | 20.0 | 13.0 | 12.80 | 0.20 | 0.00 |
| Example 5 | Presence | 0.40 | 0.04 | 0.02 | 0.88 | 1.2 | 18.0 | 13.0 | 12.80 | 0.20 | 0.00 |
| Example 6 | Presence | 0.43 | 0.06 | 0.06 | 1.01 | 1.2 | 16.0 | 13.0 | 12.80 | 0.20 | 0.00 |
| Example 7 | Presence | 0.56 | 0.03 | 0.06 | 1.23 | 1.2 | 16.0 | 13.0 | 12.80 | 0.20 | 0.00 |
| Example 8 | Presence | 0.65 | 0.04 | 0.08 | 1.44 | 1.2 | 14.0 | 13.0 | 12.80 | 0.20 | 0.00 |
| Example 9 | Presence | 0.69 | 0.05 | 0.12 | 1.58 | 1.2 | 14.0 | 13.0 | 12.80 | 0.20 | 0.00 |
| Example 10 | Presence | 0.41 | 0.21 | 0.12 | 1.26 | 2.0 | 16.0 | 13.0 | 12.65 | 0.35 | 0.00 |
| Example 11 | Presence | 0.72 | 0.21 | 0.04 | 1.80 | 1.2 | 6.5 | 6.0 | 5.85 | 0.15 | 0.00 |
| Example 12 | Presence | 0.61 | 0.12 | 0.02 | 1.42 | 1.2 | 8.5 | 6.0 | 5.85 | 0.15 | 0.00 |
| Example 13 | Presence | 0.43 | 0.21 | 0.03 | 1.21 | 1.2 | 10.0 | 8.0 | 7.80 | 0.20 | 0.00 |
| Example 14 | Presence | 0.00 | 0.05 | 0.15 | 0.23 | 1.6 | 24.5 | 15.0 | 14.60 | 0.40 | 0.00 |
| Example 15 | Presence | 0.00 | 0.02 | 0.10 | 0.13 | 1.6 | 29.5 | 20.0 | 19.70 | 0.30 | 0.00 |
| Example 16 | Presence | 0.12 | 0.16 | 0.02 | 0.50 | 1.2 | 16.0 | 0.5 | 0.50 | 0.00 | 0.00 |
| Example 17 | Presence | 0.15 | 0.12 | 0.01 | 0.49 | 1.2 | 16.0 | 4.0 | 3.70 | 0.30 | 0.00 |
| Example 18 | Presence | 0.00 | 0.00 | 0.13 | 0.13 | 1.6 | 28.0 | 20.5 | 19.70 | 0.45 | 0.30 |
| Example 19 | Presence | 0.20 | 0.08 | 0.03 | 0.55 | 1.6 | 16.0 | 11.0 | 10.45 | 0.10 | 0.45 |
| Example 20 | Presence | 0.13 | 0.10 | 0.02 | 0.43 | 1.2 | 16.0 | 10.0 | 9.20 | 0.20 | 0.60 |
| Comparative Example 1 | Absence |  |  |  |  | 1.6 | 25.0 | 13.0 | 12.80 | 0.20 | 0.00 |
| Comparative Example 2 | Absence |  |  |  |  | 1.2 | 18.0 | 13.0 | 12.80 | 0.20 | 0.00 |
| Comparative Example 3 | Absence |  |  |  |  | 1.2 | 16.0 | 0.5 | 0.50 | 0.00 | 0.00 |
| Comparative Example 4 | Absence |  |  |  |  | 1.6 | 28.0 | 20.5 | 19.70 | 0.45 | 0.30 |

|  | $TiO_2$ [%] | $SiO_2$ [%] | $ZrO_2$ [%] | $Al_2O_3$ [%] | $Na_2O$ [%] | $K_2O$ [%] | $Li_2O$ [%] | Total of Alkali Metal Oxide [%] | Weld Metal Strength Class |
|---|---|---|---|---|---|---|---|---|---|
| Example 1 | 7.35 | 2.00 | 1.50 | 1.00 | 0.30 | 0.10 | 0.05 | 0.45 | 490 MPa |
| Example 2 | 7.35 | 2.00 | 1.50 | 1.00 | 0.30 | 0.10 | 0.05 | 0.45 | 490 MPa |
| Example 3 | 7.35 | 2.00 | 1.50 | 1.00 | 0.30 | 0.10 | 0.05 | 0.45 | 490 MPa |
| Example 4 | 7.35 | 2.00 | 1.50 | 1.00 | 0.30 | 0.10 | 0.05 | 0.45 | 490 MPa |
| Example 5 | 7.35 | 2.00 | 1.50 | 1.00 | 0.30 | 0.10 | 0.05 | 0.45 | 490 MPa |
| Example 6 | 7.35 | 2.00 | 1.50 | 1.00 | 0.30 | 0.10 | 0.05 | 0.45 | 490 MPa |
| Example 7 | 7.35 | 2.00 | 1.50 | 1.00 | 0.30 | 0.10 | 0.05 | 0.45 | 490 MPa |
| Example 8 | 7.35 | 2.00 | 1.50 | 1.00 | 0.30 | 0.10 | 0.05 | 0.45 | 490 MPa |
| Example 9 | 7.35 | 2.00 | 1.50 | 1.00 | 0.30 | 0.10 | 0.05 | 0.45 | 490 MPa |

TABLE 1-continued

|  | $D_{t-b}$ | ... | ... | ... | ... | ... | ... | ... |  |
|---|---|---|---|---|---|---|---|---|---|
| Example 10 | 6.05 | 2.00 | 1.50 | 1.70 | 0.40 | 0.30 | 0.05 | 0.75 | 490 MPa |
| Example 11 | 3.60 | 1.50 | 0.00 | 0.05 | 0.20 | 0.20 | 0.00 | 0.40 | 780 MPa |
| Example 12 | 2.65 | 1.70 | 0.50 | 0.30 | 0.20 | 0.20 | 0.00 | 0.40 | 780 MPa |
| Example 13 | 4.70 | 1.70 | 0.70 | 0.00 | 0.20 | 0.20 | 0.05 | 0.45 | 780 MPa |
| Example 14 | 9.60 | 2.50 | 1.00 | 0.00 | 0.40 | 0.20 | 0.05 | 0.65 | 490 MPa |
| Example 15 | 13.10 | 2.50 | 1.50 | 1.00 | 0.40 | 0.30 | 0.10 | 0.80 | 490 MPa |
| Example 16 | 0.20 | 0.20 | 0.00 | 0.05 | 0.01 | 0.01 | 0.00 | 0.02 | 490 MPa |
| Example 17 | 1.60 | 1.40 | 0.20 | 0.10 | 0.20 | 0.10 | 0.00 | 0.30 | 490 MPa |
| Example 18 | 12.30 | 3.00 | 2.60 | 1.00 | 0.30 | 0.10 | 0.05 | 0.45 | 490 MPa |
| Example 19 | 1.90 | 3.80 | 2.50 | 1.80 | 0.20 | 0.10 | 0.00 | 0.30 | 550 MPa |
| Example 20 | 5.40 | 0.17 | 2.50 | 0.30 | 0.30 | 0.10 | 0.08 | 0.48 | 490 MPa |
| Comparative Example 1 | 7.35 | 2.00 | 1.50 | 1.00 | 0.30 | 0.10 | 0.05 | 0.45 | 490 MPa |
| Comparative Example 2 | 7.35 | 2.00 | 1.50 | 1.00 | 0.30 | 0.10 | 0.05 | 0.45 | 490 MPa |
| Comparative Example 3 | 0.20 | 0.20 | 0.00 | 0.05 | 0.01 | 0.01 | 0.00 | 0.02 | 490 MPa |
| Comparative Example 4 | 12.30 | 3.00 | 2.60 | 1.00 | 0.30 | 0.10 | 0.05 | 0.45 | 490 MPa |

TABLE 2

|  | $D_{t-b}$ [mm] | $0.3 \times D_{t-b}$ [mm] | $D_{t-k}$ [mm] | $D_{t-b}-8$ [mm] | Diffusible Hydrogen Amount (Ordinary Torch) [ml/100 g] | Diffusible Hydrogen Amount (Special Torch) [ml/100 g] | Hydrogen Reduction Rate | Flux Spill | Bead Appearance (Bead Flatness) | Bead Appearance (Slag Seizure) | Arc Stability |
|---|---|---|---|---|---|---|---|---|---|---|---|
| Example 1 | 25.0 | 7.5 | 15.0 | 17.0 | 8.3 | 3.0 | 63.9 | C | A | A | A |
| Example 2 | 25.0 | 7.5 | 15.0 | 17.0 | 7.9 | 2.9 | 63.3 | B | A | A | A |
| Example 3 | 25.0 | 7.5 | 15.0 | 17.0 | 6.7 | 2.6 | 61.2 | B | A | A | A |
| Example 4 | 25.0 | 7.5 | 15.0 | 17.0 | 6.9 | 3.2 | 53.6 | A | A | A | A |
| Example 5 | 25.0 | 7.5 | 15.0 | 17.0 | 7.3 | 4.0 | 45.2 | A | A | A | A |
| Example 6 | 25.0 | 7.5 | 15.0 | 17.0 | 7.3 | 4.3 | 41.1 | A | A | A | A |
| Example 7 | 25.0 | 7.5 | 15.0 | 17.0 | 7.9 | 4.8 | 39.2 | A | A | A | A |
| Example 8 | 25.0 | 7.5 | 15.0 | 17.0 | 7.6 | 4.9 | 35.5 | A | A | A | A |
| Example 9 | 25.0 | 7.5 | 15.0 | 17.0 | 8.2 | 5.6 | 31.7 | A | A | A | A |
| Example 10 | 25.0 | 7.5 | 15.0 | 17.0 | 8.6 | 5.3 | 38.4 | A | A | A | A |
| Example 11 | 25.0 | 7.5 | 15.0 | 17.0 | 4.3 | 3.0 | 30.2 | A | C | C | A |
| Example 12 | 25.0 | 7.5 | 15.0 | 17.0 | 4.2 | 2.7 | 35.7 | A | C | C | A |
| Example 13 | 25.0 | 7.5 | 15.0 | 17.0 | 4.8 | 3.0 | 37.5 | A | B | B | A |
| Example 14 | 25.0 | 7.5 | 15.0 | 17.0 | 9.5 | 3.8 | 60.0 | B | A | A | A |
| Example 15 | 25.0 | 7.5 | 15.0 | 17.0 | 11.6 | 4.4 | 62.1 | B | A | B | A |
| Example 16 | 25.0 | 7.5 | 15.0 | 17.0 | 3.9 | 2.2 | 43.6 | B | B | C | C |
| Example 17 | 25.0 | 7.5 | 15.0 | 17.0 | 5.4 | 2.7 | 50.0 | B | B | C | A |
| Example 18 | 25.0 | 7.5 | 15.0 | 17.0 | 10.1 | 3.9 | 61.4 | B | B | A | A |
| Example 19 | 25.0 | 7.5 | 15.0 | 17.0 | 6.6 | 3.4 | 48.5 | A | A | A | B |
| Example 20 | 25.0 | 7.5 | 15.0 | 17.0 | 7.0 | 2.9 | 58.6 | A | A | A | A |
| Comparative Example 1 | 25.0 | 7.5 | 15.0 | 17.0 | 5.8 | 4.5 | 22.4 | A | A | A | A |
| Comparative Example 2 | 25.0 | 7.5 | 15.0 | 17.0 | 5.6 | 4.6 | 17.9 | A | A | A | A |
| Comparative Example 3 | 25.0 | 7.5 | 15.0 | 17.0 | 3.6 | 3.0 | 16.7 | A | B | C | C |
| Comparative Example 4 | 25.0 | 7.5 | 15.0 | 17.0 | 8.2 | 6.2 | 24.4 | A | B | A | A |

TABLE 3

|  | Wire Seam | La [mm] | Lb [mm] | Lc [mm] | Lseam [mm] | Wire Diameter [mm] | Flux Ratio [%] | Slag Ratio [%] | Total of Metal Oxide [%] | Total of Metal Fluoride [%] |
|---|---|---|---|---|---|---|---|---|---|---|
| Example 21 | Presence | 0.07 | 0.23 | 0.05 | 0.54 | 1.6 | 10.0 | 9.50 | 1.20 | 5.00 |
| Example 22 | Presence | 0.13 | 0.16 | 0.06 | 0.56 | 1.6 | 15.0 | 4.80 | 0.50 | 4.30 |
| Example 23 | Presence | 0.09 | 0.23 | 0.02 | 0.55 | 1.6 | 15.0 | 5.00 | 0.35 | 4.65 |
| Example 24 | Presence | 0.11 | 0.12 | 0.02 | 0.42 | 1.2 | 12.0 | 7.50 | 0.80 | 4.70 |
| Example 25 | Presence | 0.35 | 0.16 | 0.08 | 1.02 | 2.0 | 14.0 | 6.10 | 0.10 | 1.80 |
| Example 26 | Presence | 0.03 | 0.31 | 0.08 | 0.61 | 1.6 | 13.0 | 7.70 | 0.20 | 7.50 |

TABLE 3-continued

|  | Total of Metal Carbonate [%] | CaF$_2$ [%] | BaF$_2$ [%] | SrF$_2$ [%] | CaF$_2$ + BaF$_2$ + SrF$_2$ [%] | CaCO$_3$ [%] | BaCO$_3$ [%] | CaCO$_3$ + BaCO$_3$ [%] | Weld Metal Strength Class |
|---|---|---|---|---|---|---|---|---|---|
| Example 21 | 3.30 | 4.80 | 0.00 | 0.00 | 4.80 | 3.30 | 0.00 | 3.30 | 490 MPa |
| Example 22 | 0.00 | 0.00 | 4.30 | 0.00 | 4.30 | 0.00 | 0.00 | 0.00 | 490 MPa |
| Example 23 | 0.00 | 0.00 | 2.00 | 2.50 | 4.50 | 0.00 | 0.00 | 0.00 | 490 MPa |
| Example 24 | 2.00 | 4.00 | 0.50 | 0.20 | 4.70 | 1.50 | 0.50 | 2.00 | 490 MPa |
| Example 25 | 4.20 | 1.00 | 0.70 | 0.00 | 1.70 | 1.20 | 3.00 | 4.20 | 490 MPa |
| Example 26 | 0.00 | 3.50 | 3.00 | 1.00 | 7.50 | 0.00 | 0.00 | 0.00 | 490 MPa |

TABLE 4

|  | $D_{t\text{-}b}$ [mm] | $0.3 \times D_{t\text{-}b}$ [mm] | $D_{t\text{-}k}$ [mm] | $D_{t\text{-}b}-8$ [mm] | Diffusible Hydrogen Amount (Ordinary Torch) [ml/100 g] | Diffusible Hydrogen Amount (Special Torch) [ml/100 g] | Hydrogen Reduction Rate | Flux Spill | Bead Appearance (Bead Flatness) | Bead Appearance (Slag Seizure) | Arc Stability |
|---|---|---|---|---|---|---|---|---|---|---|---|
| Example 21 | 25.0 | 7.5 | 15.0 | 17.0 | 3.2 | 1.9 | 40.6 | A | B | A | B |
| Example 22 | 25.0 | 7.5 | 15.0 | 17.0 | 8.3 | 3.4 | 59.0 | A | A | B | B |
| Example 23 | 25.0 | 7.5 | 15.0 | 17.0 | 9.1 | 3.6 | 60.4 | A | A | B | B |
| Example 24 | 25.0 | 7.5 | 15.0 | 17.0 | 4.8 | 2.8 | 41.7 | A | B | A | B |
| Example 25 | 25.0 | 7.5 | 15.0 | 17.0 | 4.2 | 2.5 | 40.5 | A | C | B | B |
| Example 26 | 25.0 | 7.5 | 15.0 | 17.0 | 8.8 | 4 | 54.5 | A | C | B | C |

TABLE 5

|  | Wire Seam | Cross Sectional Shape | La [mm] | Lb [mm] | Lc [mm] | Lseam [mm] | Wire Diameter [mm] | Flux Ratio [%] | Slag Ratio [%] | Total of Metal Oxide [%] | Total of Metal Fluoride [%] |
|---|---|---|---|---|---|---|---|---|---|---|---|
| Example 27 | Presence | Lap | 0.19 | 0.06 | 0.02 | 0.49 | 1.2 | 20.0 | 13.0 | 12.80 | 0.20 |
| Example 28 | Presence | Lap | 0.19 | 0.06 | 0.02 | 0.49 | 1.2 | 20.0 | 13.0 | 12.80 | 0.20 |
| Example 29 | Presence | Lap | 0.19 | 0.06 | 0.02 | 0.49 | 1.2 | 20.0 | 13.0 | 12.80 | 0.20 |
| Example 30 | Presence | Lap | 0.19 | 0.06 | 0.02 | 0.49 | 1.2 | 20.0 | 13.0 | 12.80 | 0.20 |
| Example 31 | Presence | Lap | 0.19 | 0.06 | 0.02 | 0.49 | 1.2 | 20.0 | 13.0 | 12.80 | 0.20 |
| Example 32 | Presence | Lap | 0.19 | 0.06 | 0.02 | 0.49 | 1.2 | 20.0 | 13.0 | 12.80 | 0.20 |
| Example 33 | Presence | Lap | 0.19 | 0.06 | 0.02 | 0.49 | 1.2 | 20.0 | 13.0 | 12.80 | 0.20 |
| Example 34 | Presence | Lap | 0.19 | 0.06 | 0.02 | 0.49 | 1.2 | 20.0 | 13.0 | 12.80 | 0.20 |

|  | Total of Metal Carbonate [%] | TiO$_2$ [%] | SiO$_2$ [%] | ZrO$_2$ [%] | Al$_2$O$_3$ [%] | Na$_2$O [%] | K$_2$O [%] | Li$_2$O [%] | Total of Alkali Metal Oxide [%] | Weld Metal Strength Class |
|---|---|---|---|---|---|---|---|---|---|---|
| Example 27 | 0.00 | 7.35 | 2.00 | 1.50 | 1.00 | 0.30 | 0.10 | 0.05 | 0.45 | 490 MPa |
| Example 28 | 0.00 | 7.35 | 2.00 | 1.50 | 1.00 | 0.30 | 0.10 | 0.05 | 0.45 | 490 MPa |
| Example 29 | 0.00 | 7.35 | 2.00 | 1.50 | 1.00 | 0.30 | 0.10 | 0.05 | 0.45 | 490 MPa |
| Example 30 | 0.00 | 7.35 | 2.00 | 1.50 | 1.00 | 0.30 | 0.10 | 0.05 | 0.45 | 490 MPa |
| Example 31 | 0.00 | 7.35 | 2.00 | 1.50 | 1.00 | 0.30 | 0.10 | 0.05 | 0.45 | 490 MPa |
| Example 32 | 0.00 | 7.35 | 2.00 | 1.50 | 1.00 | 0.30 | 0.10 | 0.05 | 0.45 | 490 MPa |
| Example 33 | 0.00 | 7.35 | 2.00 | 1.50 | 1.00 | 0.30 | 0.10 | 0.05 | 0.45 | 490 MPa |
| Example 34 | 0.00 | 7.35 | 2.00 | 1.50 | 1.00 | 0.30 | 0.10 | 0.05 | 0.45 | 490 MPa |

TABLE 6

|  | $D_{t\text{-}b}$ [mm] | $0.3 \times D_{t\text{-}b}$ [mm] | $D_{t\text{-}k}$ [mm] | $D_{t\text{-}b}-8$ [mm] | Diffusible Hydrogen Amount (Ordinary Torch) [ml/100 g] | Diffusible Hydrogen Amount (Special Torch) [ml/100 g] | Hydrogen Reduction Rate | Flux Spill | Bead Appearance (Bead Flatness) | Bead Appearance (Slag Seizure) | Arc Stability |
|---|---|---|---|---|---|---|---|---|---|---|---|
| Example 27 | 15.0 | 4.5 | 7.0 | 7.0 | 8.1 | 4.8 | 40.7 | — | A | A | A |
| Example 28 | 20.0 | 6.0 | 10.0 | 12.0 | 7.6 | 4.7 | 38.2 | — | A | A | A |
| Example 29 | 30.0 | 9.0 | 15.0 | 22.0 | 6.0 | 3.3 | 45.0 | — | A | A | A |

TABLE 6-continued

|  | $D_{t-b}$ [mm] | $0.3 \times D_{t-b}$ [mm] | $D_{t-k}$ [mm] | $D_{t-b}-8$ [mm] | Diffusible Hydrogen Amount (Ordinary Torch) [ml/100 g] | Diffusible Hydrogen Amount (Special Torch) [ml/100 g] | Hydrogen Reduction Rate | Flux Spill | Bead Appearance (Bead Flatness) | Bead Appearance (Slag Seizure) | Arc Stability |
|---|---|---|---|---|---|---|---|---|---|---|---|
| Example 30 | 35.0 | 10.5 | 20.0 | 27.0 | 5.2 | 2.8 | 46.2 | — | B | A | B |
| Example 31 | 25.0 | 7.5 | 7.0 | 17.0 | 6.9 | 4.5 | 34.8 | — | A | A | A |
| Example 32 | 25.0 | 7.5 | 8.0 | 17.0 | 6.9 | 4.1 | 40.6 | — | A | A | A |
| Example 33 | 25.0 | 7.5 | 16.0 | 17.0 | 6.9 | 3.2 | 53.6 | — | A | A | A |
| Example 34 | 25.0 | 7.5 | 19.0 | 17.0 | 6.9 | 3.0 | 56.5 | — | A | A | A |

In Examples 1 to 9, the slag design was identical in each example and the Lseam value was varied. As the Lseam was large, the hydrogen reduction rate was lower.

Example 1 is an example in which a value of Lseam is small. With this wire, the evaluation of the flux spill is lowered. In Example 16, the slag ratio and the addition amount of alkali metal oxide were low. With this wire, the evaluations of the slag seizure and the arc stability are lowered. Since the same wire as in Example 4 was used in Examples 27 to 34, the evaluation of the flux spill was omitted.

In Examples 4 and 27 to 30, the distance $D_{t-b}$ along the longitudinal direction of the welding wire between the tip of the contact tip and the base metal was varied, and the distance $D_{t-k}$ along the longitudinal direction of the welding wire from the tip of the contact tip to the tip of the suction nozzle was appropriately adjusted. In all cases, a good hydrogen reduction rate is attained.

In Examples 4 and 31 to 34, the distance $D_{t-k}$ was varied while the distance $D_{t-b}$ was constant. As the distance $D_{t-k}$ is long, the hydrogen reduction rate tends to be large.

In Examples 10 to 15 and 17 to 20, the Lseam, the wire diameter, the flux ratio, the slag ratio, the metal oxide amount, the metal fluoride amount, the metal carbonate amount and the alkali metal oxide amount were appropriately varied. In all cases, a good hydrogen reduction rate is attained.

As described above, in Examples 21 to 26, a flux cored wire containing a slag forming agent that contained a metal fluoride as the main slag component was used. In all cases, a good hydrogen reduction rate is attained.

In each of Comparative Examples 1 to 4, since no seam portion was provided, the hydrogen reduction rate was as low as less than 30%.

The disclosure content of this specification includes the following aspects.

(Aspect 1)

A welding method using a special torch and a flux cored wire, in which the special torch has a suction nozzle between a contact tip and a shield nozzle, and the flux cored wire has a flux filled inside a steel outer casing, and a seam portion where both ends of a metal in a width direction of the steel outer casing are butted or overlapped in a longitudinal direction of the flux cored wire.

(Aspect 2)

The welding method according to the aspect 1, in which in a cross section of the seam portion, when a length of a portion where clearance at both ends of the metal in the width direction of the steel outer casing is less than 20 μm is denoted by La, a length of a portion where clearance is 20 μm or more and less than 40 μm is denoted by Lb, and a length of a portion where clearance is 40 μm or more and less than 100 μm is denoted by Lc, a value represented by Lseam=2.0×La+1.5×Lb+Lc is 0.1 to 1.5 mm.

(Aspect 3)

The welding method according to the aspect 1 or 2, in which the flux cored wire has a wire diameter of 1.2 to 2.0 mm and a ratio of the flux to a total mass of the flux cored wire is 8 to 30 mass %.

(Aspect 4)

The welding method according to any one of the aspects 1 to 3, in which the flux contains a slag forming agent, the slag forming agent is composed of at least one compound selected from the group consisting of a metal oxide, a metal fluoride and a metal carbonate and an impurity, and a ratio of the slag forming agent to the total mass of the flux cored wire is 3 to 21 mass %.

(Aspect 5)

The welding method according to the aspect 4, in which the slag forming agent contains, in a ratio to the total mass of the flux cored wire:

3.5 to 20.5 mass % of the metal oxide;

0 to 0.5 mass % (including 0) of the metal fluoride; and 0 to 0.5 mass % (including 0) of the metal carbonate.

(Aspect 6)

The welding method according to the aspect 4 or 5, in which the metal oxide contains, in a ratio to the total mass of the flux cored wire:

1.5 to 15.0 mass % of $TiO_2$;

0.15 to 4.0 mass % of $SiO_2$;

0 to 3.0 mass % (including 0) of $ZrO_2$;

0 to 2.0 mass % (including 0) of $Al_2O_3$; and 0.01 to 0.8 mass % of $(Na_2O+K_2O+Li_2O)$.

(Aspect 7)

The welding method according to the aspect 4, in which the slag forming agent contains, in a ratio to the total mass of the flux cored wire:

0 to 1.5 mass % (including 0) of the metal oxide;

1.5 to 8.5 mass % of the metal fluoride; and 0 to 5.0 mass % (including 0) of the metal carbonate.

(Aspect 8)

The welding method according to the aspect 4 or 7, in which the metal fluoride contains, in a ratio to the total mass of the flux cored wire:

0 to 5.0 mass % (including 0) of $CaF_2$;

0 to 5.0 mass % (including 0) of $BaF_2$;

0 to 5.0 mass % (including 0) of $SrF_2$; and 1.5 to 8.0 mass % of $(CaF_2+BaF_2+SrF_2)$.

(Aspect 9)

The welding method according to any one of the aspects 4, 7 and 8, in which the metal carbonate contains 0 to 5 mass % (including 0) of $(CaCO_3+BaCO_3)$ in a ratio to the total mass of the flux cored wire.

(Aspect 10)

The welding method according to any one of the aspects 1 to 9, in which a distance $D_{t-b}$ along a longitudinal direction of a welding wire between a tip end of the contact tip and a base material in the special torch is 15 to 40 mm, and a distance $D_{t-k}$ along the longitudinal direction of the welding wire from the tip end of the contact tip to a tip end of the suction nozzle and the distance $D_{t-b}$ satisfy relationships:

$$D_{t-k} \text{ (mm)} \geq 0.3 \times D_{t-b} \text{ (mm) and}$$

$$D_{t-k} \text{ (mm)} \leq D_{t-b} \text{ (mm)} - 8.$$

This application claims the benefit of Japanese Patent Application No. 2016-044223 filed in the Japan Patent Office on Mar. 8, 2016. Japanese Patent Application No. 2016-044223 is herein incorporated by reference.

INDUSTRIAL APPLICABILITY

The welding method according to the embodiment of the present invention can prevent the diffusible hydrogen amount of the weld metal from increasing, and can achieve good weldability and welding efficiency even when a high tensile strength steel plate and a thick plate are welded using an inexpensive seamed flux cored wire.

REFERENCE SIGNS LIST

1: Steel wire
2: Hydrogen source
3: Steel outer casing
4: Seam portion

The invention claimed is:

1. A welding method, comprising:
performing welding by feeding a flux cored wire to protrude from a contact tip and produce a protruded portion, while discharging an electric current through the protruded portion of the flux cored wire, to form an electric arc and melt the protruded portion of the flux cored wire;
supplying a shielding gas from a shielding gas nozzle, to provide a gas shield around the protruded portion of the flux cored wire; and
sucking the shielding gas during the welding step using a suction nozzle provided between the contact tip and the shielding gas nozzle,
wherein the flux cored wire comprises:
a steel outer casing,
a flux filled inside the steel outer casing, and
a seam portion of the steel outer casing where opposing ends of the steel outer casing in a width direction of the steel outer casing are butted or overlapped, the seam portion extending in a longitudinal direction of the flux cored wire,
wherein, in a cross section of the seam portion, when a length of a portion of a clearance between said ends of the steel outer casing where the size of the clearance is less than 20 μm is denoted by La, a length of a portion of said clearance where the size of the clearance is 20 μm or more and less than 40 μm is denoted by Lb, and a length of a portion of said clearance where the size of the clearance is 40 μm or more and less than 100 μm is denoted by Lc, a value represented by Lseam=2.0×La+1.5×Lb+Lc is 0.1 to 1.5 mm.

2. The welding method according to claim 1, wherein the flux cored wire has a wire diameter of 1.2 to 2.0 mm and a ratio of the flux to a total mass of the flux cored wire is 8 to 30 mass %.

3. The welding method according to claim 1, wherein the flux comprises a slag forming agent, the slag forming agent comprising at least one compound selected from the group consisting of a metal oxide, a metal fluoride and a metal carbonate and an impurity, and a ratio of the slag forming agent to the total mass of the flux cored wire is 3 to 21 mass %.

4. The welding method according to claim 3, wherein the slag forming agent comprises, in a ratio to the total mass of the flux cored wire:
3.5 to 20.5 mass % of the metal oxide;
0 to 0.5 mass % of the metal fluoride; and
0 to 0.5 mass % of the metal carbonate.

5. The welding method according to claim 4, wherein the metal oxide comprises, in a ratio to the total mass of the flux cored wire:
1.5 to 15.0 mass % of $TiO_2$;
0.15 to 4.0 mass % of $SiO_2$;
0 to 3.0 mass % of $ZrO_2$;
0 to 2.0 mass % of $Al_2O_3$; and
0.01 to 0.8 mass % of $(Na_2O+K_2O+Li_2O)$.

6. The welding method according to claim 3, wherein the slag forming agent comprises, in a ratio to the total mass of the flux cored wire:
0 to 1.5 mass % of the metal oxide;
1.5 to 8.5 mass % of the metal fluoride; and
0 to 5.0 mass % of the metal carbonate.

7. The welding method according to claim 6, wherein the metal fluoride comprises, in a ratio to the total mass of the flux cored wire:
0 to 5.0 mass % of $CaF_2$;
0 to 5.0 mass % of $BaF_2$;
0 to 5.0 mass % of $SrF_2$; and
1.5 to 8.0 mass % of $(CaF_2+BaF_2+SrF_2)$.

8. The welding method according to claim 3, wherein the metal carbonate comprises 0 to 5 mass % of $(CaCO_3+BaCO_3)$ in a ratio to the total mass of the flux cored wire.

9. The welding method according to claim 1, wherein
a distance $D_{t-b}$ along a longitudinal direction of the welding wire between a tip end of the contact tip and a base material in the special torch is 15 to 40 mm, and
a distance $D_{t-k}$ along the longitudinal direction of the welding wire from the tip end of the contact tip to a tip end of the suction nozzle and the distance $D_{t-b}$ satisfy relationships:

$$D_{t-k} \text{ (mm)} \geq 0.3 \times D_{t-b} \text{ (mm) and}$$

$$D_{t-k} \text{ (mm)} \leq D_{t-b} \text{ (mm)} - 8.$$

* * * * *